(12) United States Patent
Yamazaki

(10) Patent No.: US 8,814,956 B2
(45) Date of Patent: Aug. 26, 2014

(54) POWER STORAGE DEVICE, ELECTRODE, AND MANUFACTURING METHOD THEREOF

(75) Inventor: Shunpei Yamazaki, Tokyo (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 13/546,012

(22) Filed: Jul. 11, 2012

(65) Prior Publication Data

US 2013/0017443 A1    Jan. 17, 2013

(30) Foreign Application Priority Data

Jul. 14, 2011    (JP) ................................ 2011-155745

(51) Int. Cl.
*H01M 4/13*     (2010.01)

(52) U.S. Cl.
USPC ...... 29/623.5; 29/623.1; 429/209; 429/218.1; 429/231.8

(58) Field of Classification Search
None
See application file for complete search history.

(56) References Cited

U.S. PATENT DOCUMENTS

| | | | |
|---|---|---|---|
| 4,764,853 | A | 8/1988 | Thomas et al. |
| 6,134,902 | A | 10/2000 | Curry |
| 7,179,561 | B2 | 2/2007 | Niu et al. |
| 7,745,047 | B2 | 6/2010 | Zhamu et al. |
| 7,842,432 | B2 | 11/2010 | Niu et al. |
| 7,939,218 | B2 | 5/2011 | Niu |
| 7,977,007 | B2 | 7/2011 | Niu et al. |
| 7,977,013 | B2 | 7/2011 | Niu et al. |
| 8,278,011 | B2 | 10/2012 | Zhu et al. |
| 2007/0295718 | A1 | 12/2007 | Takei et al. |
| 2008/0254296 | A1 | 10/2008 | Handa et al. |
| 2009/0045680 | A1 | 2/2009 | Litch et al. |
| 2009/0123850 | A1 | 5/2009 | Takeuchi et al. |
| 2010/0081057 | A1 | 4/2010 | Liu et al. |
| 2010/0143798 | A1 | 6/2010 | Zhamu et al. |
| 2010/0176337 | A1 | 7/2010 | Zhamu et al. |
| 2010/0248034 | A1 | 9/2010 | Oki et al. |
| 2010/0330421 | A1 | 12/2010 | Cui et al. |

(Continued)

FOREIGN PATENT DOCUMENTS

| | | |
|---|---|---|
| JP | 2001-210315 | 8/2001 |
| JP | 2006-265751 | 10/2006 |

(Continued)

OTHER PUBLICATIONS

Liu et al. Thin Solid Films 518 (2010) S128- S132.*

(Continued)

*Primary Examiner* — Milton I Cano
*Assistant Examiner* — Wojciech Haske
(74) *Attorney, Agent, or Firm* — Jeffrey L. Costellia; Nixon Peabody LLP

(57) ABSTRACT

To provide a power storage device with improved cycle characteristics. In the power storage device, a conductive catalyst layer is provided in contact with a surface of an active material layer formed of silicon or the like and a carbon layer is provided over the conductive catalyst layer. The carbon layer is formed by a CVD method using an effect of the catalyst layer. The carbon layer formed by a CVD method is crystalline and helps prevent an impurity such as an SEI from being attached to a surface of an electrode of the power storage device, leading to improvements in cycle characteristics of the power storage device.

20 Claims, 6 Drawing Sheets

(56) References Cited

U.S. PATENT DOCUMENTS

| | | |
|---|---|---|
| 2011/0012067 A1 | 1/2011 | Kay |
| 2011/0111303 A1 | 5/2011 | Kung et al. |
| 2011/0121240 A1 | 5/2011 | Amine et al. |
| 2011/0159372 A1 | 6/2011 | Zhamu et al. |
| 2011/0229795 A1 | 9/2011 | Niu et al. |
| 2011/0266654 A1 | 11/2011 | Kuriki et al. |
| 2011/0291240 A1 | 12/2011 | Yamazaki |
| 2012/0003383 A1 | 1/2012 | Furuno |
| 2012/0003807 A1 | 1/2012 | Furuno et al. |
| 2012/0308884 A1 | 12/2012 | Oguni et al. |
| 2013/0011550 A1 | 1/2013 | Takeuchi et al. |

FOREIGN PATENT DOCUMENTS

| | | |
|---|---|---|
| JP | 2007-042620 | 2/2007 |
| JP | 2009-524567 | 7/2009 |
| JP | 2009-176721 | 8/2009 |
| JP | 2011-503804 | 1/2011 |
| JP | 2011-048992 | 3/2011 |
| JP | 2011-517053 | 5/2011 |
| WO | WO-2006/062947 A2 | 6/2006 |
| WO | WO-2007/061945 A2 | 5/2007 |
| WO | WO-2009/061685 A1 | 5/2009 |
| WO | WO-2009/127901 A1 | 10/2009 |
| WO | WO-2009/144600 A2 | 12/2009 |

OTHER PUBLICATIONS

Nemes-Incze et al. Carbon 46 (2008) 1435-1442.*
Wang et al. Scripta Materialia 48 (2003) 409-412.*
Tiwari et al. J. Power Sources 195 (2010) 729-735.*
Sharma et al. Journal of Crystal Growth 267 (2004) 613-618.*
Zhou.X et al., "Graphene modified LiFePO4 cathode materials for high power lithium ion batteries ,", J. Mater. Chem. (Journal of Materials Chemistry), 2011, vol. 21, pp. 3353-3358.
Su.F et al., "Flexible and planar graphene conductive additives for lithium-ion batteries,", J. Mater. Chem. (Journal of Materials Chemistry), 2010, vol. 20, pp. 9644-9650.
Yu.G et al., "Solution-Processed Graphene/MnO2 Nanostructured Textiles for High-Performance Electrochemical Capacitors,", Nano Letters, 2011, vol. 11, No. 7, pp. 2905-2911.
Chan, et al., "High-Performance Lithium Battery Anodes Using Silicon Nanowires", vol. 3, Dec. 16, 2007, pp. 31-35.

* cited by examiner

POWER STORAGE DEVICE, ELECTRODE, AND MANUFACTURING METHOD THEREOF

BACKGROUND OF THE INVENTION

1. Field of the Invention

The present invention relates to a power storage device and a method for manufacturing the power storage device. Note that, in this specification, power storage devices refer to part or all of devices each having a function of storing electric power.

2. Description of the Related Art

In recent years, power storage devices such as lithium-ion secondary batteries and lithium-ion capacitors have been developed. Further, it has been proposed that such power storage devices be used in a variety of electric appliances such as a refrigerator (see Patent Document 1), an air conditioner (see Patent Document 2), an indoor lighting device (see Patent Document 3), and a microwave oven (see Patent Document 4).

An electrode for the power storage device is manufactured by forming an active material over a surface of a current collector. When an active material formed over one surface of a current collector has a layer-like shape, it is referred to as an active material layer. Note that the active material layer may contain a material other than the active material (e.g., a conductive additive or a binder). As an active material which occludes lithium, such as graphite or silicon, is used, because these materials can occlude and release ions serving as carriers. In particular, silicon has attracted attention because it has a higher theoretical capacity than graphite and is advantageous in increasing the capacities of power storage devices.

For example, Non-Patent Document 1 discloses a lithium-ion secondary battery formed using whisker-like single crystal silicon as an active material. Non-Patent Document 1 suggests that in the case where whisker-like silicon is used, the structure of an electrode is not easily damaged even when the volume of silicon is changed due to occlusion and release of lithium ions, resulting in increases in charge/discharge characteristics.

REFERENCE

[Patent Document 1] United States Patent Application Publication No. 2009/0045680
[Patent Document 2] U.S. Pat. No. 6,134,902
[Patent Document 3] U.S. Pat. No. 4,764,853
[Patent Document 4] United States Patent Application Publication No. 2007/0295718
[Non-Patent Document 1] CANDACE K. CHAN et al., "High-performance lithium battery anodes using silicon nanowires", *Nature Nanotechnology*, 2008, Vol. 3, pp. 31-35

SUMMARY OF THE INVENTION

It is generally known that during charge/discharge of a lithium-ion secondary battery, an active material and an electrolyte react with each other to form a compound film which is a decomposition product of the electrolyte over an electrode surface. Such a compound film is referred to as a solid electrolyte interface (SEI) and thought necessary to relieve and stabilize a reaction between an electrode and an electrolyte.

However, the thickness depends on a combination of the electrode and the electrolyte and thus may become larger than necessary. In general, when silicon is used as an active material, an SEI is formed larger than that formed in the case of using graphite. Examples of adverse effects due to the formation of the SEI include a reduction in coulombic efficiency, a reduction in lithium ion conductivity between an electrode and an electrolyte, and loss of an electrolyte.

Such phenomena may occur not only in lithium-ion secondary batteries and are common to power storage devices in which alkali metal ions or alkaline-earth metal ions are used as carrier ions. Further, also in the case where a material other than silicon is used as an active material, similar problems may occur. Furthermore, similar problems may occur not only in the case where an organic electrolyte solution is used as an electrolyte but also in the case where a solid electrolyte or an ionic liquid is used as an electrolyte.

An object of one embodiment of the present invention is to provide a power storage device in which formation of an SEI is suppressed, in order to solve the above problems. Another object of one embodiment of the present invention is to provide a power storage device with excellent charge/discharge characteristics. Another object is to provide a power storage device which has high reliability and can withstand long-term or repeated use. One embodiment of the present invention achieves at least one of the above objects.

One embodiment of the present invention is a power storage device or an electrode of a power storage device. The power storage device or the electrode of the power storage device includes a current collector, an active material layer over the current collector, a conductive catalyst layer in contact with the active material layer, and a carbon layer in contact with the catalyst layer.

One embodiment of the present invention is a manufacturing method of a power storage device or a manufacturing method of an electrode of a power storage device. The manufacturing method includes the steps of forming an active material layer over a current collector; forming a catalyst layer having conductivity so that it is in contact with the active material layer; and forming a carbon layer over the catalyst layer by a vapor deposition method.

In the above, the catalyst layer preferably contains one or more of copper, nickel, titanium, manganese, cobalt, and iron. The thickness of the carbon layer is preferably 0.4 nm to 4 nm inclusive. The carbon layer is preferably formed of a single-layer graphene or a stack of 2 or more and 10 or less layers of graphene (hereinafter referred to as a stack of layers of graphene). Note that the thickness of the catalyst layer is preferably 0.1 nm to 10 nm inclusive.

In the above, the active material layer may contain any of silicon, germanium, tin, and aluminum. Further, when silicon is used as an active material, the silicon may contain phosphorus or boron. The active material layer can be formed by a chemical vapor deposition (CVD) method or a vapor phase-liquid phase-solid phase (VLS) deposition method. Further, the active material layer may include a whisker-like object. Furthermore, the active material layer may be crystalline or amorphous, or partly crystalline and partly amorphous.

Generally, in the case where an active material layer is amorphous, an alloy layer is not easily formed between the active material layer and a current collector; thus, adhesion to the current collector can be maintained even in occlusion of carrier ions, resulting in prevention of separation of the active material from the current collector. Note that even in the case where an active material layer is crystalline, the active material layer becomes amorphous after occluding a certain proportion or more of carrier ions and remains amorphous even after releasing the carrier ions.

In the above structure, the electrolyte is in contact with the carbon layer. Since the carbon layer is more stable than the active material such as silicon and there is a limitation on the thickness of an SEI formed due to a reaction between the carbon layer and the electrolyte, the thickness of the SEI is sufficiently smaller than that formed in the case where the active material is in contact with the electrolyte. Particularly when the carbon layer is formed of a stack of layers of crystalline graphene, the surface thereof is chemically inactive; therefore, such a tendency is prominent.

The carbon layer is preferably formed of a stack of layers of graphene because $sp^2$ bonds are parallel to a surface of the carbon layer, and thus, the mechanical strength of the carbon layer is sufficient, which can prevent separation or detachment of the carbon layer from the active material. In particular, a carbon layer formed by a CVD method is highly crystalline and thus is significantly favorable. Note that an excessively thick carbon layer may possibly hinder the transfer of carrier ions.

The catalyst layer functions as a catalyst when the carbon layer is formed by a CVD method and may also have a function of relieving stress which inhibits separation of the carbon layer. The catalyst layer is preferably formed using a material which obstructs neither occlusion nor release of carrier ions.

DETAILED DESCRIPTION OF THE INVENTION

Figure 1A:
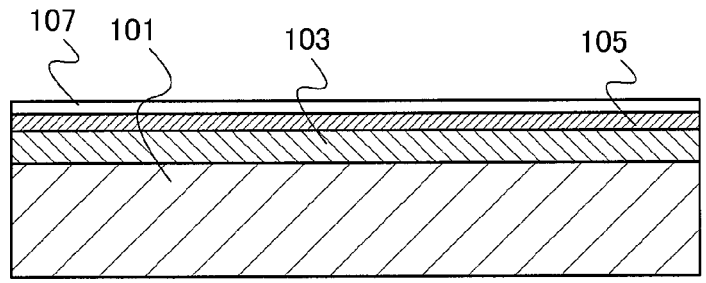
FIGS. 1A to 1C are cross-sectional views which illustrate a method for manufacturing a negative electrode of a power storage device.

Embodiments of the present invention will be described below with reference to the drawings. Note that the present invention is not limited to the following description, and it will be easily understood by those skilled in the art that various changes and modifications can be made without departing from the spirit and scope of the present invention. Thus, the present invention should not be interpreted as being limited to the following description of the embodiments. In description using the drawings for reference, in some cases, common reference numerals are used for the same portions in different drawings. Further, in some cases, the same hatching patterns are applied to similar portions, and the similar portions are not necessarily designated by reference numerals.

(Embodiment 1)

In this embodiment, an electrode of a power storage device according to one embodiment of the present invention and a method for manufacturing the electrode will be described with reference to FIGS. 1A to 1C and FIGS. 2A and 2B.

First, a silicon layer is formed as an active material layer 103 over a current collector 101 by an evaporation method, a sputtering method, a plasma CVD method, a thermal CVD method (preferably a low-pressure chemical vapor deposition (LPCVD) method), or the like (see FIG. 1A).

The current collector 101 functions as a current collector of the electrode. Thus, a conductive material having a foil shape, a plate shape, or a net shape is used. For example, the current collector 101 can be formed using a metal element with high conductivity, typified by platinum, aluminum, copper, or titanium. Alternatively, an aluminum alloy to which silicon, titanium, neodymium, scandium, molybdenum, or the like is added in order to improve heat resistance may be used.

Alternatively, a silicon wafer may be used as the current collector 101. Still alternatively, the current collector 101 may be formed using a metal element which forms silicide. Examples of the metal element which forms silicide include zirconium, titanium, hafnium, vanadium, niobium, tantalum, chromium, molybdenum, tungsten, cobalt, and nickel.

When the silicon layer is formed by a CVD method such as a plasma CVD method or a thermal CVD method, a deposition gas containing silicon is used as a source gas. As the deposition gas containing silicon, silicon hydride, silicon fluoride, silicon chloride, and the like are given; typically, $SiH_4$, $Si_2H_6$, $SiF_4$, $SiCl_4$, $Si_2Cl_6$, and the like are given. Note that a rare gas such as helium, neon, argon, or xenon or hydrogen may be mixed into the source gas. The silicon layer may be formed by an evaporation method or a sputtering method.

Note that an impurity element imparting one conductivity type, such as phosphorus or boron, may be added to the silicon layer. The silicon layer to which the impurity element imparting one conductivity type, such as phosphorus or boron, is added has higher conductivity, so that the conductivity of the electrode can be increased. Accordingly, the internal resistance of the power storage device can be reduced.

In the case where the silicon layer is formed by a plasma CVD method, a thermal CVD method, or an LPCVD method, deposition may be performed in an atmosphere containing an impurity element imparting one conductivity type, such as phosphorus or boron. For example, in order to make the silicon layer contain phosphorus, phosphine may be contained in a source gas. In the case where the silicon layer is formed by an evaporation method or a sputtering method, the silicon layer may be doped with an impurity element imparting one conductivity type, such as phosphorus or boron.

Note that there is no particular limitation on the crystallinity of the silicon layer. The silicon layer may be either amorphous or crystalline. As the silicon layer, an amorphous silicon layer, a microcrystalline silicon layer, a single crystal silicon layer, or a polycrystalline silicon layer can be used, for example. The silicon layer may be subjected to crystallization treatment. In the case where crystallization treatment is performed on the silicon layer, after the hydrogen concentration in the silicon layer is sufficiently reduced, the silicon layer may be subjected to heat treatment at a temperature at which heat treatment can be performed, or the silicon layer may be irradiated with laser light to be crystallized.

When the silicon layer is formed by a CVD method, oxygen or the like originated from a chamber of a CVD apparatus might be contained as an impurity in the silicon layer.

Further, when the silicon layer is formed, an oxide film having low conductivity, such as a natural oxide film, is formed on a surface of the silicon layer. Therefore, the function of the electrode might decrease because the oxide film, such as a natural oxide film, which is formed on the surface of the silicon layer, is overloaded at the time of charge/discharge. Accordingly, the improvement of the cycle characteristics of the power storage device is hindered in some cases. That is why the oxide film, such as a natural oxide film, which is formed on the surface of the silicon layer, is preferably removed in the next step.

Here, the oxide film, such as a natural oxide film, which is formed on the surface of the silicon layer can be removed by wet etching treatment using, as an etchant, a solution containing hydrofluoric acid or an aqueous solution containing hydrofluoric acid. By the etching treatment for removing the oxide film such as a natural oxide film, at least the oxide film such as a natural oxide film needs to be removed; thus, dry etching treatment may be used instead.

Alternatively, wet etching treatment and dry etching treatment may be used in combination. For the dry etching treatment, a parallel plate reactive ion etching (RIE) method, an inductively coupled plasma (ICP) etching method, or the like can be used.

After that, a catalyst layer 105 with conductivity is formed over and in contact with the active material layer 103 by a CVD method or a sputtering method (see FIG. 1A). Here, the thickness of the catalyst layer 105 is preferably 0.1 nm to 10 nm inclusive.

Here, the catalyst layer 105 can be formed by a CVD method or a sputtering method using a metal element with high conductivity, typified by copper, nickel, titanium, manganese, cobalt, iron, or the like; it is particularly preferable to use copper or iron. The catalyst layer 105 preferably contains at least one of the metal elements. Further, it is preferable to use an element having low reactivity to carrier ions (e.g., lithium ions) for the catalyst layer 105.

In those respects, it is significantly preferable to use copper for the catalyst layer 105 in manufacture of a lithium-ion secondary battery because it transmits lithium ions and serves as a catalyst in formation of graphene having good quality.

When a layer including whisker-like silicon (hereinafter referred to as whiskers) to be described later is used as the active material layer 103, a metalorganic CVD method is preferably employed in deposition of the above metal element used for the catalyst layer 105. Alternatively, an electroplating method may be employed.

An important role of the catalyst layer 105 is to form a carbon layer 107 on a surface of the catalyst layer 105; thus, the catalyst layer 105 needs to have such an effect. Specifically, the catalyst layer 105 is heated to 450° C. to 1000° C. and exposed to an atmosphere of acetylene, methane, or the like, whereby the carbon layer 107 can be formed on the surface of the catalyst layer 105.

The carbon layer 107 formed in such a manner may be a stack of layers of highly crystalline graphene. When the carbon layer 107 formed of a stack of layers of highly crystalline graphene is excessively thick, the transfer of carrier ions is hampered. Thus, in the case where the carbon layer 107 is formed of a stack of layers of graphene, the number of layers of graphene is preferably 1 to 10 inclusive.

The active material layer 103 expands when it absorbs carrier ions and contracts when it releases carrier ions. Therefore, in some cases, the active material layer 103 is damaged when charge/discharge cycles are repeated.

However, covering the active material layer 103 with the catalyst layer 105 and the carbon layer 107 allows suppression of a volume change of the active material layer 103 due to absorption and release of carrier ions, which prevents the active material layer 103 from being damaged even when charge/discharge cycles are repeated. Accordingly, the power storage device can have excellent cycle characteristics.

Figure 1B:
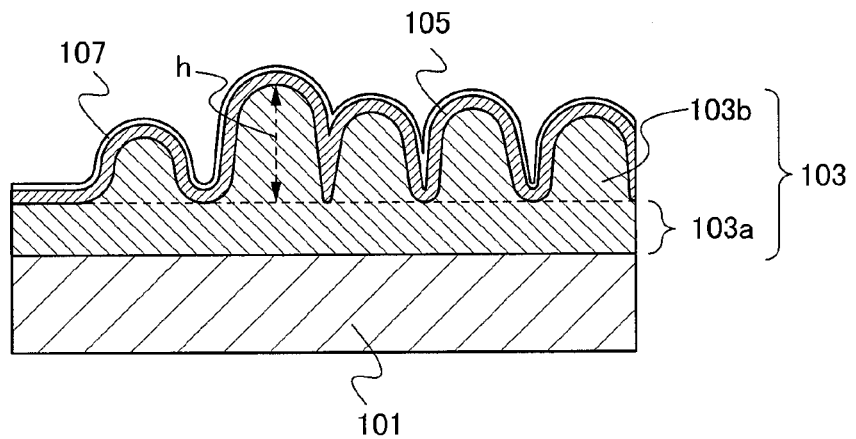

When the active material layer 103 is formed using silicon by an LPCVD method, the active material layer 103 can include a silicon region 103a and a silicon region 103b including whiskers over the silicon region 103a (see FIG. 1B). Depending on deposition conditions, a portion corresponding to the silicon region 103a is formed extremely thin or not formed in some cases.

The active material layer 103 including the silicon region 103a and the silicon region 103b including whiskers over the silicon region 103a is formed using a deposition gas containing silicon as a source gas while heating is performed at a temperature higher than 500° C. and lower than or equal to the upper temperature limit up to which an LPCVD apparatus and the current collector 101 can withstand, preferably a temperature higher than or equal to 530° C. and lower than 650° C., for example.

The boundary between the silicon region 103a and the silicon region 103b including whiskers is vague and thus, the following plane is defined as a tentative boundary between the silicon region 103a and the silicon region 103b including whiskers: a plane which includes a valley formed between the adjacent whiskers of the silicon region 103b including whiskers.

The silicon region 103a is formed to cover the current collector 101. The whisker in the silicon region 103b may have a columnar shape such as a cylinder shape or a prism shape, a conical shape, a pyramidal shape, a needle-like shape, or a thread-like shape. The top of the whisker may be curved. The diameter of the whisker is 50 nm to 10 μm inclusive, preferably 500 nm to 3 μm inclusive. In addition, the length of the whisker is 0.5 μm to 1000 μm inclusive, preferably 1.0 μm to 100 μm inclusive.

Here, the length h of the whisker refers to the size in the growth direction (longitudinal direction) of the whisker. Given that the whisker has a columnar shape, the length of the whisker means the distance between the top surface and the bottom surface of the whisker. Given that the whisker has a conical or pyramidal shape, the length of the whisker means the distance between the apex and the bottom surface of the whisker. In addition, the thickness of the silicon layer refers to the sum of the thickness of the silicon region 103a and the thickness of the silicon region 103b including whiskers, and the thickness of the silicon region 103b including whiskers refers to the distance between the highest point of the whiskers and the boundary between the silicon region 103a and the silicon region 103b including whiskers.

Note that in the following description, the growth direction of the whisker (the direction in which the whisker extends from the silicon region 103a) may be referred to as the longitudinal direction and a cross-sectional shape along the longitudinal direction may be referred to as a longitudinal cross-sectional shape. In addition, a shape of a cross section of the whisker, in which the longitudinal direction is the normal direction, may be referred to as a transverse cross-sectional shape.

As illustrated in FIG. 1B, the whiskers may extend in one longitudinal direction, for example, in the direction of the normal to a surface of the silicon region 103a. Note that in this case, the longitudinal directions of the whiskers may be substantially the same as the direction of the normal to the surface of the silicon region 103a. In other words, the longitudinal cross-sectional shapes of the whiskers are mainly shown in FIG. 1B.

Figure 1C:
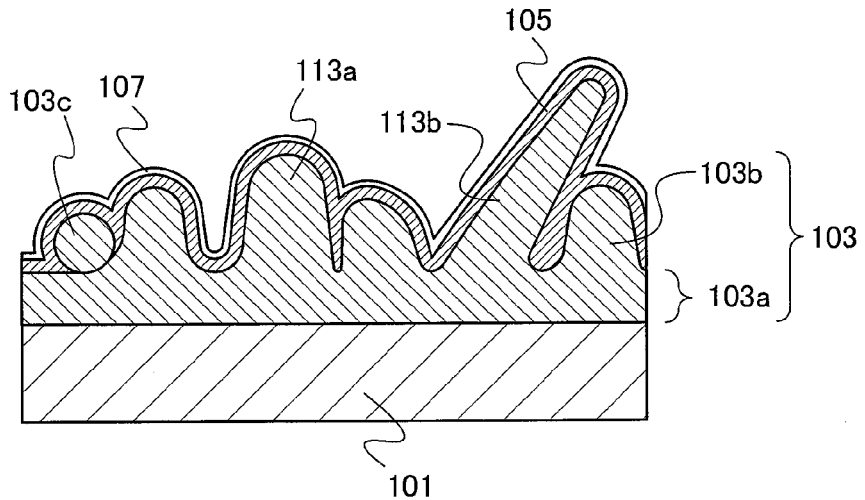

As illustrated in FIG. 1C, the longitudinal directions of the whiskers may be not the same. Typically, the silicon region 103b including whiskers may include a first whisker 113a whose longitudinal direction is substantially the same as the direction of the normal to the surface of the silicon region 103*a* and a second whisker 113*b* whose longitudinal direction is different from the direction of the normal to the surface of the silicon region 103*a*.

Further, the length of the second whisker 113*b* may be longer than that of the first whisker 113*a*. That is, in FIG. 1C, the transverse cross-sectional shape of the whisker, like a region 103*c*, is illustrated together with the longitudinal cross-sectional shape of the whisker. The region 103*c* is circular because it is a transverse cross-sectional shape of the whisker having a cylinder shape or a conical shape. However, when the whisker has a prism shape or a pyramidal shape, the region 103*c* is polygonal. When the longitudinal directions of the whiskers are not the same, the whiskers are tangled with each other in some cases; therefore, separation of the whiskers is less likely to occur at the time of charge and discharge of the power storage device.

The electrode of the power storage device in FIG. 1B or 1C includes a whisker-like crystalline silicon layer as the active material layer. When whiskers are thus included in the active material layer, the surface area of the active material layer increases; therefore, the discharge capacity of the power storage device can be increased.

Figure 2A:
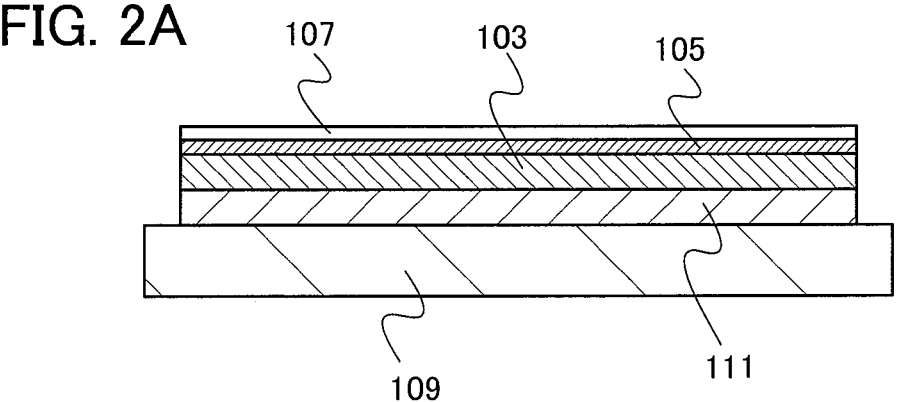
FIGS. 2A and 2B are cross-sectional views which illustrate a method for manufacturing a negative electrode of a power storage device.

Note that FIGS. 1A to 1C illustrate the cases where the current collector 101 is formed using a conductive material having a foil shape, a plate shape, or a net shape; however, the following case illustrated in FIG. 2A may be employed: the case where a thin current collector 111 is formed over a substrate 109, using a sputtering method, an evaporation method, a printing method, an inkjet method, a CVD method, or the like as appropriate, and the active material layer 103 formed of silicon, the catalyst layer 105, and the carbon layer 107 are formed over the thin current collector 111.

Figure 2B:
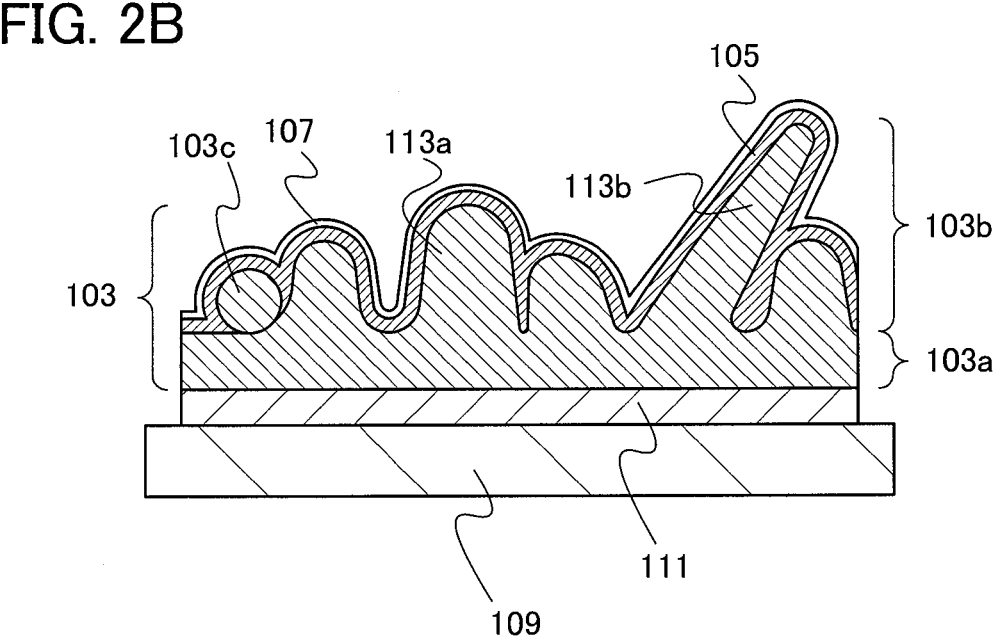

Similarly, the following case illustrated in FIG. 2B may be employed: the case where the thin current collector 111 is formed over the substrate 109, using a sputtering method, an evaporation method, a printing method, an inkjet method, a CVD method, or the like as appropriate, and the active material layer 103 is formed over the thin current collector 111 by an LPCVD method so that the active material layer 103 can include the silicon region 103*a* and the silicon region 103*b* including whiskers over the silicon region 103*a*. Further, the catalyst layer 105 and the carbon layer 107 may be formed to cover them.

Through the above process, the electrode of the power storage device having a high discharge capacity can be manufactured. This embodiment can be implemented in combination with any of the other embodiments.

(Embodiment 2)

In this embodiment, a structure of a power storage device will be described with reference to FIGS. 3A and 3B.

First, a structure of a secondary battery which is an example of a power storage device will be described. Among secondary batteries, a lithium-ion secondary battery formed using a lithium-containing metal oxide such as lithium iron phosphate or lithium cobalt oxide, or the like has high discharge capacity. Here, a structure of a lithium-ion secondary battery, a typical example of a secondary battery, will be described.

Figure 3A:
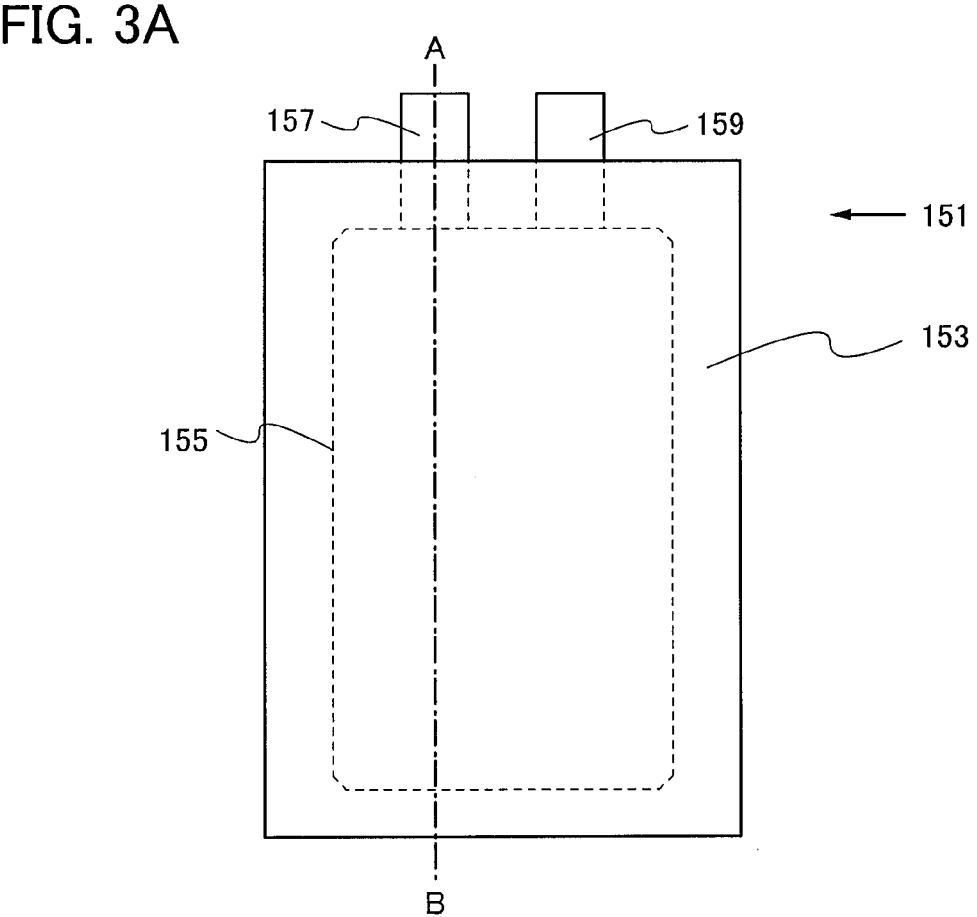
FIGS. 3A and 3B are a plan view and a cross-sectional view which illustrate a power storage device according to one embodiment.
Figure 3B:
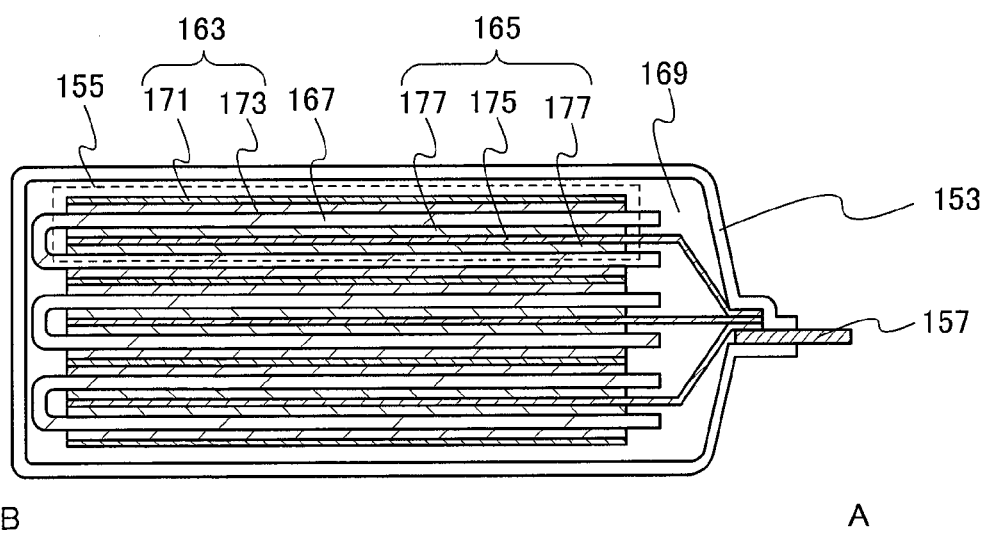

FIG. 3A is a plan view of a power storage device 151, and FIG. 3B is a cross-sectional view along dashed dotted line A-B in FIG. 3A.

The power storage device 151 in FIG. 3A includes a power storage cell 155 in an exterior member 153. The power storage device 151 further includes terminal portions 157 and 159 which are connected to the power storage cell 155. For the exterior member 153, a laminate film, a polymer film, a metal film, a metal case, a plastic case, or the like can be used.

As illustrated in FIG. 3B, the power storage cell 155 includes a negative electrode 163, a positive electrode 165, a separator 167 between the negative electrode 163 and the positive electrode 165, and an electrolyte 169 with which a portion almost surrounded with the exterior member 153 is filled.

The negative electrode 163 includes a negative electrode current collector 171 and a negative electrode active material layer 173. The positive electrode 165 includes a positive electrode current collector 175 and a positive electrode active material layer 177. The negative electrode active material layer 173 is formed on one surface or opposite surfaces of the negative electrode current collector 171. The positive electrode active material layer 177 is formed on one surface or opposite surfaces of the positive electrode current collector 175.

The negative electrode current collector 171 is connected to the terminal portion 157. The positive electrode current collector 175 is connected to the terminal portion 159. Further, the terminal portions 157 and 159 each partly extend outside the exterior member 153.

Although a sealed thin power storage device is described as the power storage device 151 in this embodiment, power storage devices having a variety of structures, such as a button power storage device, a cylindrical power storage device, and a rectangular power storage device, can also be manufactured. Further, although the structure where the positive electrode, the negative electrode, and the separator are stacked is described in this embodiment, a structure where the positive electrode, the negative electrode, and the separator are rolled may be employed.

As the negative electrode current collector 171, the current collector 101 or the thin current collector 111, which is described in Embodiment 1, can be used.

The negative electrode active material layer 173 including the active material layer 103 formed of silicon, the catalyst layer 105, and the carbon layer 107, which are described in Embodiment 1, is provided over the negative electrode current collector 171. Note that the silicon layer may be pre-doped with lithium.

Aluminum, stainless steel, or the like is used for the positive electrode current collector 175. The positive electrode current collector 175 can have a foil shape, a plate shape, a net shape, or the like as appropriate.

The positive electrode active material layer 177 can be formed using a lithium compound such as $LiFeO_2$, $LiCoO_2$, $LiNiO_2$, $LiMn_2O_4$, $LiFePO_4$, $LiCoPO_4$, $LiNiPO_4$, or $LiMnPO_4$ as a material. In the case where carrier ions are alkali metal ions other than lithium ions, or alkaline-earth metal ions, the positive electrode active material layer 177 may contain, instead of lithium in the lithium compound, an alkali metal (e.g., sodium or potassium), an alkaline-earth metal (e.g., calcium, strontium, or barium), magnesium, or the like.

As a solute of the electrolyte 169, a material containing lithium ions, i.e., carrier ions, is used. Typical examples of the solute of the electrolyte include lithium salts such as $LiClO_4$, $LiAsF_6$, $LiBF_4$, $LiPF_6$, and $Li(C_2F_5SO_2)_2N$. Note that in the case where carrier ions are alkali metal ions other than lithium ions, or alkaline-earth metal ions, an alkali metal salt such as sodium salt or potassium salt; an alkaline-earth metal salt such as calcium salt, strontium salt, or barium salt; magnesium salt; or the like can be used as appropriate as the solute of the electrolyte 169.

As the solvent of the electrolyte 169, a material in which carrier ions can transfer is used. As the solvent of the electrolyte 169, an aprotic organic solvent is preferably used. Typical examples of aprotic organic solvents include ethylene carbonate, propylene carbonate, dimethyl carbonate, diethyl carbonate, γ-butyrolactone, acetonitrile, dimethoxyethane, tetrahydrofuran, and the like, and one or more of these materials can be used.

Further, the use of a gelled high-molecular/polymer material as the solvent of the electrolyte 169 reduces the possibility of liquid leakage, so that safety is improved. Note that the power storage device 151 can be thin and lightweight. Typical examples of gelled high-molecular/polymer materials include a silicon gel, an acrylic gel, an acrylonitrile gel, polyethylene oxide, polypropylene oxide, and a fluorine-based polymer. As the electrolyte 169, a solid electrolyte such as $Li_3PO_4$ can be used.

As the separator 167, an insulating porous material is used. An organic substance such as cellulose (paper), polyethylene, or polypropylene can be used as the separator 167. Alternatively, an inorganic substance such as a glass fiber may be used.

A lithium-ion secondary battery has a small memory effect, a high energy density, and a high discharge capacity. In addition, the output voltage of the lithium-ion secondary battery is high. Thus, it is possible to reduce the size and weight of the lithium-ion secondary battery. Further, the lithium-ion secondary battery does not easily deteriorate due to repeated charge/discharge cycles and can be used for a long time, leading to a reduction in cost.

Next, a structure of a capacitor, another example of a power storage device, will be described. Typical examples of capacitors include a double-layer capacitor and a lithium-ion capacitor. Here, a lithium-ion capacitor will be described.

In the case of a capacitor, instead of the positive electrode active material layer 177 in the secondary battery in FIG. 3B, a material capable of reversibly occluding lithium ions and/or anions may be used. Typically, the positive electrode active material layer 177 can be formed using active carbon, a conductive high molecule/conductive polymer, a polyacenic semiconductor (PAS), or the like.

The lithium-ion capacitor has high charge/discharge efficiency which allows rapid charge/discharge, and has a long life even when it is repeatedly used.

A power storage device with improved cycle characteristics can be manufactured with the use of the electrode including the current collector 101 or the thin current collector 111, the active material layer 103, the catalyst layer 105, and the carbon layer 107, which are described in Embodiment 1, as a negative electrode in such a capacitor.

Note that a power storage device including the electrode according to one embodiment of the disclosed invention is not limited to the above device. For example, as a negative electrode of an air cell, another example of a power storage device, the electrode including the current collector and the active material layer in Embodiment 1 can be used. A power storage device with improved cycle characteristics can be manufactured also in this case.

This embodiment can be implemented in combination with any of the other embodiments.

(Embodiment 3)

The power storage device according to one embodiment of the present invention can be used for power supplies of a variety of electronic devices and electric appliances which can be operated with power.

Specific examples of electronic devices and electric appliances each utilizing the power storage device according to one embodiment of the present invention are as follows: display devices, lighting devices, desktop personal computers and laptop personal computers, image reproduction devices which reproduce still images and moving images stored in recording media such as digital versatile discs (DVDs), mobile phones, portable game machines, portable information terminals, e-book readers, video cameras, digital still cameras, high-frequency heating appliances such as microwave ovens, electric rice cookers, electric washing machines, air-conditioning systems such as air conditioners, electric appliances such as electric refrigerators, electric freezers, and electric refrigerator-freezers, freezers for preserving DNA, and medical equipment such as dialyzers.

In addition, moving objects driven by electric motors using power from power storage devices are also included in the category of electronic devices and electric appliances. Examples of the moving objects include electric vehicles, hybrid vehicles each including both an internal-combustion engine and an electric motor, and motorized bicycles including motor-assisted bicycles.

In the electronic devices and electric appliances, the power storage device according to one embodiment of the present invention can be used as a power storage device for supplying enough power for almost the whole power consumption (referred to as a main power supply). Alternatively, in the electronic devices and electric appliances, the power storage device according to one embodiment of the present invention can be used as a power storage device which can supply power to the electronic devices and electric appliances when the supply of power from the main power supply or a commercial power supply is stopped (such a power storage device is referred to as an uninterruptible power supply). Still alternatively, in the electronic devices and electric appliances, the power storage device according to one embodiment of the present invention can be used as a power storage device for supplying power to the electronic devices and electric appliances at the same time as the power supply from the main power supply or a commercial power supply (such a power storage device is referred to as an auxiliary power supply).

Figure 4:
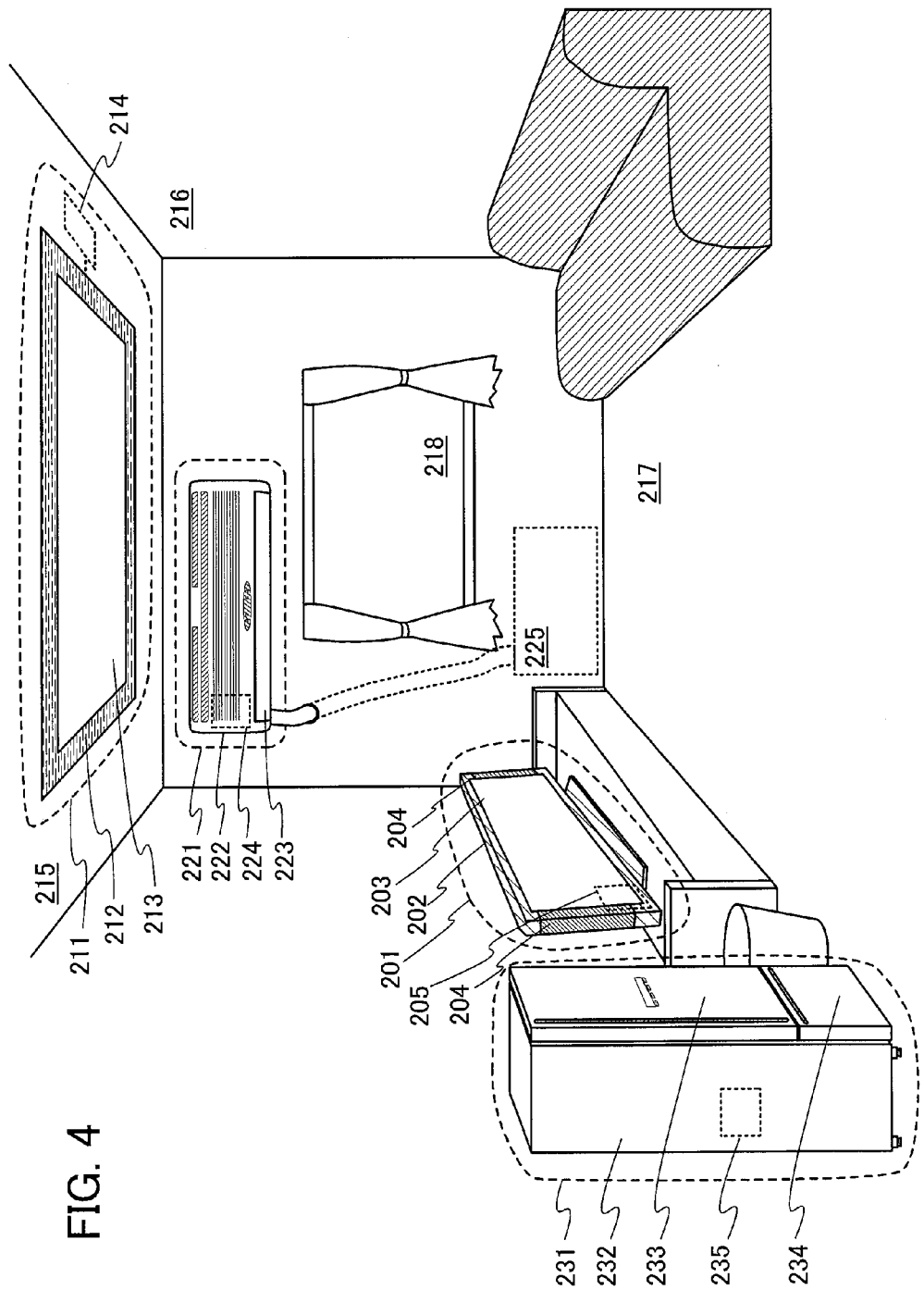
FIG. 4 illustrates application examples of power storage devices.

FIG. 4 illustrates specific structures of the electronic devices and electric appliances. In FIG. 4, a display device 201 is an example of an electronic device/electric appliance including a power storage device 205 according to one embodiment of the present invention. Specifically, the display device 201 corresponds to a display device for TV broadcast reception and includes a housing 202, a display portion 203, speaker portions 204, and the power storage device 205. The power storage device 205 according to one embodiment of the present invention is provided in the housing 202.

The display device 201 can receive power from a commercial power supply. Alternatively, the display device 201 can use power stored in the power storage device 205. Thus, the display device 201 can be operated with the use of the power storage device 205 according to one embodiment of the present invention as an uninterruptible power supply even when power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 203.

Note that the display device includes, in its category, all of information display devices for personal computers, advertisement displays, and the like besides TV broadcast reception.

In FIG. 4, an installation lighting device 211 is an example of an electric appliance including a power storage device 214 according to one embodiment of the present invention. Specifically, the lighting device 211 includes a housing 212, a light source 213, and a power storage device 214. Although FIG. 4 illustrates the case where the power storage device 214 is provided in a ceiling 215 on which the housing 212 and the light source 213 are installed, the power storage device 214 may be provided in the housing 212.

The lighting device 211 can receive power from a commercial power supply. Alternatively, the lighting device 211 can use power stored in the power storage device 214. Thus, the lighting device 211 can be operated with the use of the power storage device 214 according to one embodiment of the present invention as an uninterruptible power supply even when power cannot be supplied from a commercial power supply due to power failure or the like.

Note that although the installation lighting device 211 provided in the ceiling 215 is illustrated in FIG. 4 as an example, the power storage device according to one embodiment of the present invention can be used in an installation lighting device provided in, for example, a wall 216, a floor 217, a window 218, or the like other than the ceiling 215. Alternatively, the power storage device can be used in a tabletop lighting device or the like.

As the light source 213, an artificial light source which emits light artificially by using power can be used. Specifically, discharge lamps such as an incandescent lamp and a fluorescent lamp, and light-emitting elements such as an LED and an organic EL element are given as examples of the artificial light source.

In FIG. 4, an air conditioner including an indoor unit 221 and an outdoor unit 225 is an example of an electric appliance including a power storage device 224 according to one embodiment of the invention. Specifically, the indoor unit 221 includes a housing 222, an air outlet 223, and a power storage device 224. Although FIG. 4 illustrates the case where the power storage device 224 is provided in the indoor unit 221, the power storage device 224 may be provided in the outdoor unit 225. Alternatively, the power storage devices 224 may be provided in both the indoor unit 221 and the outdoor unit 225.

The air conditioner can receive power from a commercial power supply. Alternatively, the air conditioner can use power stored in the power storage device 224. Particularly in the case where the power storage devices 224 are provided in both the indoor unit 221 and the outdoor unit 225, the air conditioner can be operated with the use of the power storage device 224 according to one embodiment of the present invention as an uninterruptible power supply even when power cannot be supplied from a commercial power supply due to power failure or the like.

Note that although the split-type air conditioner including the indoor unit and the outdoor unit is illustrated in FIG. 4 as an example, the power storage device according to one embodiment of the present invention can be used in an air conditioner in which the functions of an indoor unit and an outdoor unit are integrated in one housing.

In FIG. 4, an electric refrigerator-freezer 231 is an example of an electric appliance including a power storage device 235 according to one embodiment of the present invention. Specifically, the electric refrigerator-freezer 231 includes a housing 232, a door for a refrigerator 233, a door for a freezer 234, and the power storage device 235. The power storage device 235 is provided in the housing 232 in FIG. 4. The electric refrigerator-freezer 231 can receive power from a commercial power supply. Alternatively, the electric refrigerator-freezer 231 can use power stored in the power storage device 235. Thus, the electric refrigerator-freezer 231 can be operated with the use of the power storage device 235 according to one embodiment of the present invention as an uninterruptible power supply even when power cannot be supplied from a commercial power supply due to power failure or the like.

Note that among the electronic devices and electric appliances described above, a high-frequency heating apparatus such as a microwave oven and an electric appliance such as an electric rice cooker require high power in a short time. The tripping of a breaker of a commercial power supply in use of an electric appliance can be prevented by using the power storage device according to one embodiment of the present invention as an auxiliary power supply for supplying power which cannot be supplied enough by a commercial power supply.

In addition, in a time period when electronic devices and electric appliances are not used, particularly when the proportion of the amount of power which is actually used to the total amount of power which can be supplied from a commercial power supply source (such a proportion referred to as a usage rate of power) is low, power can be stored in the power storage device, whereby the usage rate of power can be reduced in a time period when the electric appliances are used. For example, in the case of the electric refrigerator-freezer 231, power can be stored in the power storage device 235 in night time when the temperature is low and the door for a refrigerator 233 and the door for a freezer 234 are not often opened or closed. On the other hand, in daytime when the temperature is high and the door for a refrigerator 233 and the door for a freezer 234 are frequently opened and closed, the power storage device 235 is used as an auxiliary power supply; thus, the usage rate of power in daytime can be reduced.

(Embodiment 4)

In this embodiment, examples of using a secondary battery according to one embodiment of the present invention in a wireless power feeding system (hereinafter referred to as an RF power feeding system) will be described with reference to block diagrams in FIG. 5 and FIG. 6. In each of the block diagrams, blocks independently show elements, which are classified according to their functions, within a power receiving device and a power feeding device. However, it is practically difficult to completely separate the elements according to their functions; in some cases, one element can involve a plurality of functions.

First, the RF power feeding system will be described with reference to FIG. 5. A power receiving device 301 is included in an electronic device, an electrically propelled vehicle, or the like which is driven by electric power supplied from a power feeding device 311, and can be applied to any other devices which are driven by electric power, as appropriate.

Typical examples of the electronic device include cameras such as digital cameras and video cameras, digital photo frames, mobile phones (also referred to as mobile phone devices or cellular phones), portable game machines, portable information terminals, audio reproducing devices, display devices, computers, and the like.

Typical examples of the electrically propelled vehicle include electric vehicles, hybrid vehicles, electric railway cars, service vehicles, carts, wheelchairs, and the like. In addition, the power feeding device 311 has a function of supplying electric power to the power receiving device 301.

Figure 5:
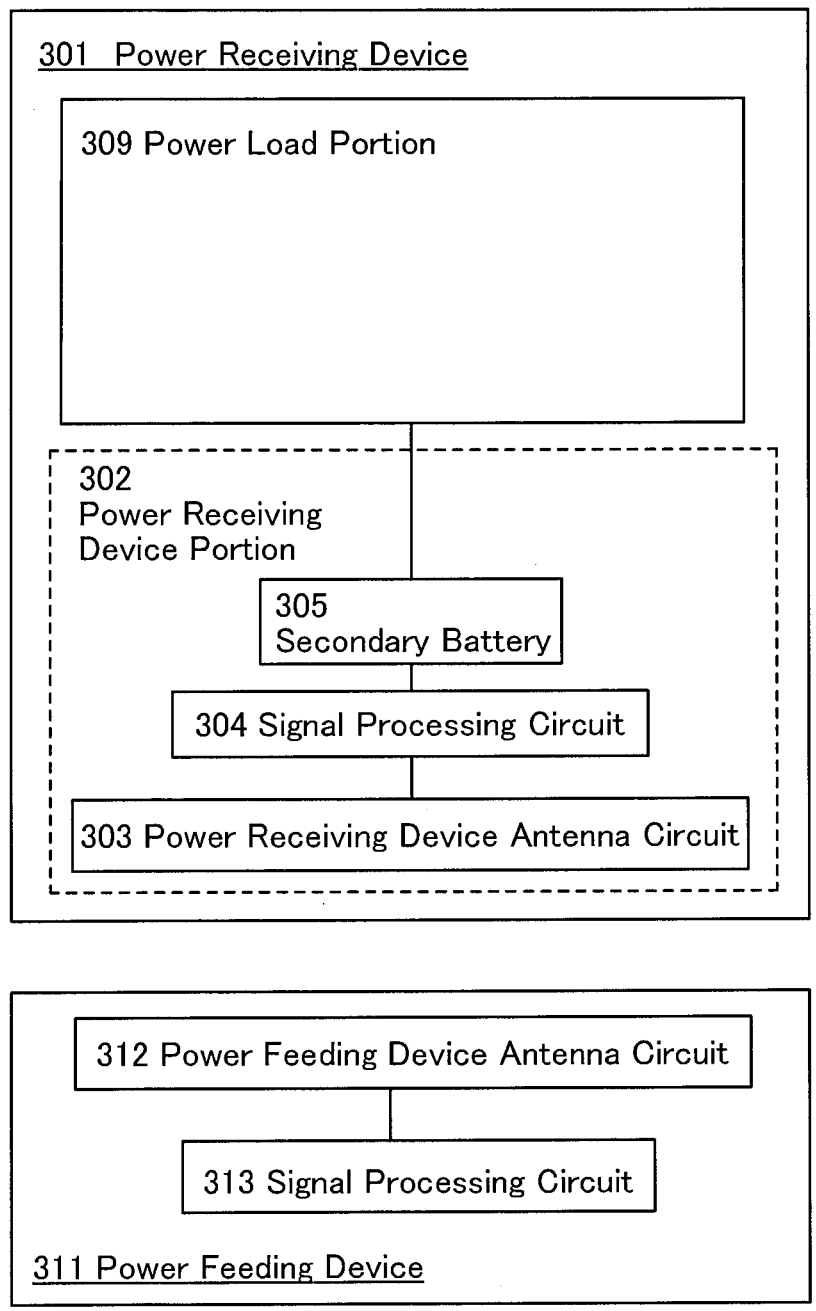
FIG. 5 illustrates a configuration of a wireless power feeding system.

In FIG. 5, the power receiving device 301 includes a power receiving device portion 302 and a power load portion 309. The power receiving device portion 302 includes at least a power receiving device antenna circuit 303, a signal processing circuit 304, and a secondary battery 305. The power feeding device 311 includes at least a power feeding device antenna circuit 312 and a signal processing circuit 313.

The power receiving device antenna circuit 303 has a function of receiving a signal transmitted by the power feeding device antenna circuit 312 and a function of transmitting a signal to the power feeding device antenna circuit 312. The signal processing circuit 304 processes a signal received by the power receiving device antenna circuit 303 and controls charging of the secondary battery 305 and supplying of electric power from the secondary battery 305 to the power load portion 309. In addition, the signal processing circuit 304 controls operation of the power receiving device antenna circuit 303. That is, the signal processing circuit 304 can control the intensity, the frequency, or the like of a signal transmitted by the power receiving device antenna circuit 303. The power load portion 309 is a drive portion which receives electric power from the secondary battery 305 and drives the power receiving device 301. Typical examples of the power load portion 309 include a motor, a driver circuit, and the like. Another device which receives electric power and drives the power receiving device may be used as the power load portion 309 as appropriate. The power feeding device antenna circuit 312 has a function of transmitting a signal to the power receiving device antenna circuit 303 and a function of receiving a signal from the power receiving device antenna circuit 303. The signal processing circuit 313 processes a signal received by the power feeding device antenna circuit 312. In addition, the signal processing circuit 313 controls operation of the power feeding device antenna circuit 312. That is, the signal processing circuit 313 can control the intensity, the frequency, or the like of a signal transmitted by the power feeding device antenna circuit 312.

The secondary battery according to one embodiment of the present invention is used as the secondary battery 305 included in the power receiving device 301 in the RF power feeding system shown in FIG. 5.

When the secondary battery according to one embodiment of the present invention is used in the RF power feeding system, the amount of power storage can be increased as compared with the case of using a conventional secondary battery. Therefore, the time interval between wireless power feeding and the next wireless power feeding can be longer (power feeding can be less frequent).

In addition, with the use of the secondary battery according to one embodiment of the present invention in the RF power feeding system, the power receiving device 301 can be compact and lightweight if the amount of stored electric power with which the power load portion 309 can be driven is the same as that of a conventional secondary battery. Therefore, the total cost can be reduced.

Next, another example of the RF power feeding system will be described with reference to FIG. 6.

Figure 6:
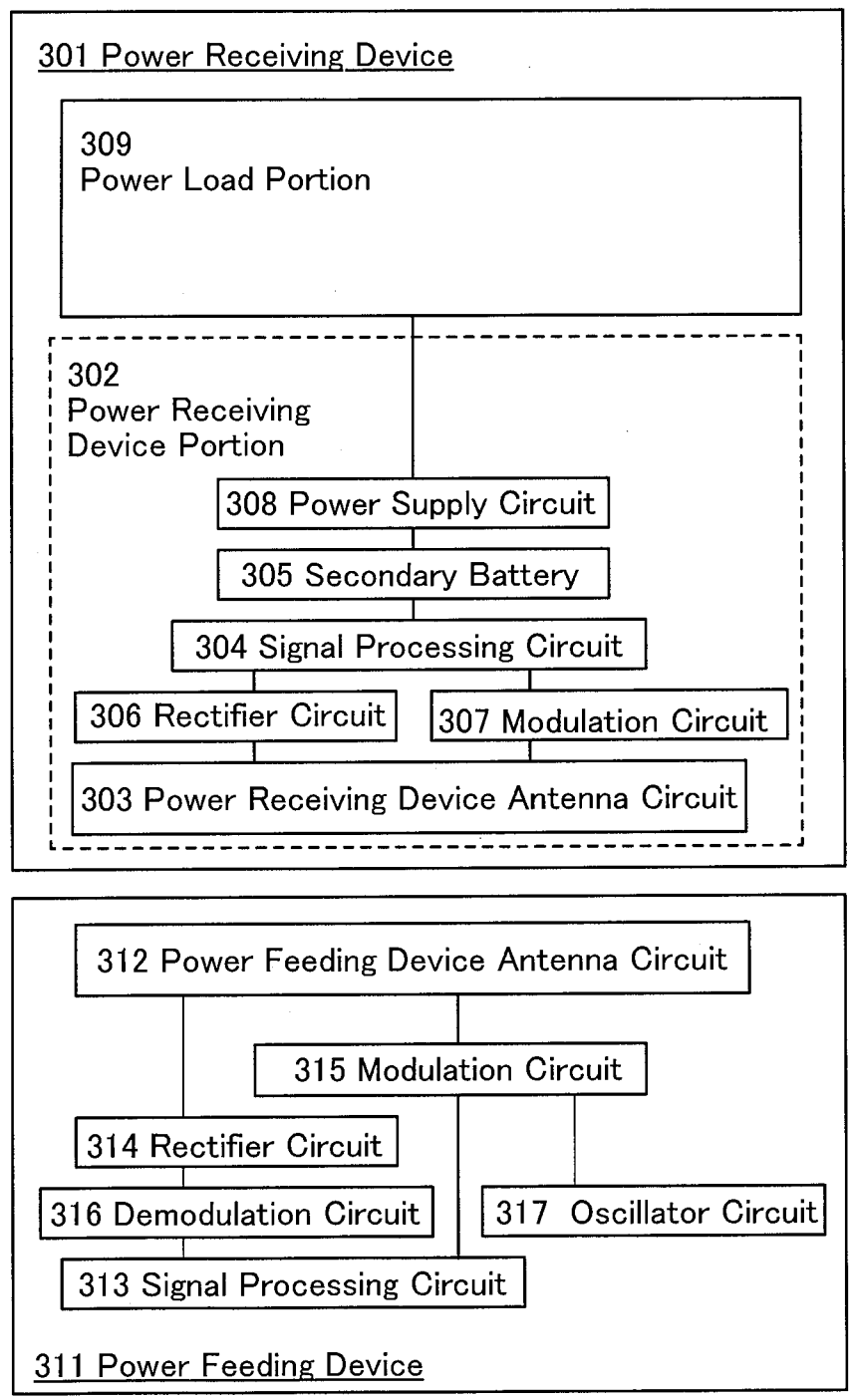
FIG. 6 illustrates a configuration of a wireless power feeding system.

In FIG. 6, the power receiving device 301 includes the power receiving device portion 302 and the power load portion 309. The power receiving device portion 302 includes at least the power receiving device antenna circuit 303, the signal processing circuit 304, the secondary battery 305, a rectifier circuit 306, a modulation circuit 307, and a power supply circuit 308. In addition, the power feeding device 311 includes at least the power feeding device antenna circuit 312, the signal processing circuit 313, a rectifier circuit 314, a modulation circuit 315, a demodulation circuit 316, and an oscillator circuit 317.

The power receiving device antenna circuit 303 has a function of receiving a signal transmitted by the power feeding device antenna circuit 312 and a function of transmitting a signal to the power feeding device antenna circuit 312. In the case where the power receiving device antenna circuit 303 receives a signal transmitted by the power feeding device antenna circuit 312, the rectifier circuit 306 generates DC voltage from the signal received by the power receiving device antenna circuit 303. The signal processing circuit 304 has a function of processing a signal received by the power receiving device antenna circuit 303 and a function of controlling charging of the secondary battery 305 and supply of electric power from the secondary battery 305 to the power supply circuit 308. The power supply circuit 308 has a function of converting voltage stored in the secondary battery 305 into voltage needed for the power load portion 309. The modulation circuit 307 is used when a certain response signal is transmitted from the power receiving device 301 to the power feeding device 311.

With the power supply circuit 308, electric power to be supplied to the power load portion 309 can be controlled. Thus, overvoltage application to the power load portion 309 can be suppressed, leading to suppression of deterioration or breakdown of the power receiving device 301.

In addition, provision of the modulation circuit 307 enables transmission of a signal from the power receiving device 301 to the power feeding device 311. Therefore, when it is judged from the amount of charge of the power receiving device 301 that a certain amount of electric power is stored, a signal is transmitted from the power receiving device 301 to the power feeding device 311 so that power feeding from the power feeding device 311 to the power receiving device 301 can be stopped. As a result, the secondary battery 305 is not fully charged, so that the number of charge cycles of the secondary battery 305 can be increased.

The power feeding device antenna circuit 312 has a function of transmitting a signal to the power receiving device antenna circuit 303 and a function of receiving a signal from the power receiving device antenna circuit 303. When a signal is transmitted to the power receiving device antenna circuit 303, the signal processing circuit 313 generates a signal to be transmitted to the power receiving device. The oscillator circuit 317 is a circuit which generates a signal with a constant frequency. The modulation circuit 315 has a function of applying voltage to the power feeding device antenna circuit 312 in accordance with the signal generated by the signal processing circuit 313 and the signal with a constant frequency generated by the oscillator circuit 317. Thus, a signal is output from the power feeding device antenna circuit 312. On the other hand, when a signal is received from the power receiving device antenna circuit 303, the rectifier circuit 314 rectifies the received signal. From signals rectified by the rectifier circuit 314, the demodulation circuit 316 extracts a signal transmitted from the power receiving device 301 to the power feeding device 311. The signal processing circuit 313 has a function of analyzing the signal extracted by the demodulation circuit 316.

Note that any other circuit may be provided between the circuits as long as the RF power feeding can be performed. For example, after the power receiving device 301 receives a signal and the rectifier circuit 306 generates DC voltage, a circuit such as a DC-DC converter or regulator that is provided in a subsequent stage may generate constant voltage. Thus, overvoltage application to the inside of the power receiving device 301 can be suppressed.

The secondary battery according to one embodiment of the present invention is used as the secondary battery 305 included in the power receiving device 301 in the RF power feeding system shown in FIG. 6.

When the secondary battery according to one embodiment of the present invention is used in the RF power feeding system, the amount of power storage can be increased as compared with the case of using a conventional secondary battery; therefore, the time interval between wireless power feeding and the next wireless power feeding can be longer (power feeding can be less frequent).

In addition, with the use of the secondary battery according to one embodiment of the present invention in the RF power feeding system, the power receiving device 301 can be compact and lightweight if the amount of stored electric power with which the power load portion 309 can be driven is the same as that of a conventional secondary battery. Therefore, the total cost can be reduced.

Note that when the secondary battery according to one embodiment of the present invention is used in the RF power feeding system and the power receiving device antenna circuit 303 and the secondary battery 305 overlap with each other, it is preferred that the impedance of the power receiving device antenna circuit 303 is not changed because of deformation of the secondary battery 305 due to charge and discharge of the secondary battery 305 and deformation of an antenna due to the above deformation. If the impedance of the antenna is changed, in some cases, electric power is not supplied sufficiently. For example, the secondary battery 305 may be packed in a battery pack formed of metal or ceramics. Note that in that case, the power receiving device antenna circuit 303 and the battery pack are preferably separated from each other by several tens of micrometers or more.

Note that there is no limitation on the frequency of the signal for charge; the signal may have any band of frequency with which electric power can be transmitted. For example, the signal for charge may have any of an LF band of 135 kHz (long wave), an HF band of 13.56 MHz, a UHF band of 900 MHz to 1 GHz, and a microwave band of 2.45 GHz.

A signal transmission method may be properly selected from various methods including an electromagnetic coupling method, an electromagnetic induction method, a resonance method, and a microwave method. In order to prevent energy loss due to foreign substances containing moisture, such as rain and mud, an electromagnetic induction method or a resonance method using a low frequency band, specifically, frequencies of short waves of 3 MHz to 30 MHz, frequencies of medium waves of 300 kHz to 3 MHz, frequencies of long waves of 30 kHz to 300 kHz, or frequencies of ultra long waves of 3 kHz to 30 kHz, is preferably used.

This embodiment can be implemented in combination with any of the other embodiments.

This application is based on Japanese Patent Application serial no. 2011-155745 filed with the Japan Patent Office on Jul. 14, 2011, the entire contents of which are hereby incorporated by reference.

What is claimed is:

1. A manufacturing method of an electrode, comprising:
    forming an active material layer over a current collector, the active material layer including a whisker of silicon;
    forming a catalyst layer by one of a metalorganic chemical vapor deposition method and an electroplating method so that the catalyst layer is in contact with and substantially covers a side surface of the whisker of silicon, the catalyst layer being capable of forming graphene thereon; and
    forming a carbon layer containing graphene over the catalyst layer by a vapor deposition method using the catalyst layer as a catalyst and using an atmosphere of a material containing carbon so that the carbon layer is in contact with the catalyst layer.

2. The manufacturing method of an electrode, according to claim 1,
    wherein the catalyst layer contains one or more of copper, nickel, titanium, manganese, cobalt, and iron.

3. The manufacturing method of an electrode, according to claim 1,
    wherein a thickness of the carbon layer is greater than or equal to 0.4 nm and less than or equal to 4 nm.

4. The manufacturing method of an electrode, according to claim 1,
    wherein a thickness of the catalyst layer is greater than or equal to 0.1 nm and less than or equal to 10 nm.

5. The manufacturing method of an electrode, according to claim 1,
    wherein the active material layer is formed by a chemical vapor deposition method.

6. The manufacturing method of an electrode, according to claim 1,
    wherein the carbon layer is formed of a stack of layers of graphene, and the number of layers of graphene is 1 or more and 10 or less.

7. The manufacturing method of an electrode, according to claim 1, wherein the carbon layer is crystalline.

8. A manufacturing method of an electrode, comprising:
    forming a catalyst layer over an active material layer by one of a metalorganic chemical vapor deposition method and an electroplating method, the active material layer including a whisker of silicon so that the catalyst layer is in contact with and substantially covers a side surface of the whisker of silicon; and
    forming a carbon layer over the catalyst layer by a vapor deposition method using the catalyst layer as a catalyst and using an atmosphere of a material containing carbon so that the carbon layer is in contact with the catalyst layer.

9. The manufacturing method of an electrode, according to claim 8,
    wherein the catalyst layer contains one or more of copper, nickel, titanium, manganese, cobalt, and iron.

10. The manufacturing method of an electrode, according to claim 8,
    wherein a thickness of the carbon layer is greater than or equal to 0.4 nm and less than or equal to 4 nm.

11. The manufacturing method of an electrode, according to claim 8,
    wherein a thickness of the catalyst layer is greater than or equal to 0.1 nm and less than or equal to 10 nm.

12. The manufacturing method of an electrode, according to claim 8,
    wherein the carbon layer is formed of a stack of layers of graphene, and the number of layers of graphene is 1 or more and 10 or less.

13. A manufacturing method of an electrode, comprising:
    forming a carbon layer containing graphene over a catalyst layer by a vapor deposition method using the catalyst layer as a catalyst and using an atmosphere of a material containing carbon so that the carbon layer is in contact with the catalyst layer,
    wherein the active material layer includes a whisker of silicon,
    wherein the catalyst layer is capable for forming graphene thereon,
    wherein the catalyst layer is in contact with and substantially covers a side surface of the whisker of silicon.

14. The manufacturing method of an electrode, according to claim 13,
    wherein the catalyst layer contains one or more of copper, nickel, titanium, manganese, cobalt, and iron.

15. The manufacturing method of an electrode, according to claim 13, wherein a thickness of the carbon layer is greater than or equal to 0.4 nm and less than or equal to 4 nm.

16. The manufacturing method of an electrode, according to claim 13,
wherein a thickness of the catalyst layer is greater than or equal to 0.1 nm and less than or equal to 10 nm.

17. The manufacturing method of an electrode, according to claim 13,
wherein the carbon layer is formed of a stack of layers of graphene, and the number of layers of graphene is 1 or more and 10 or less.

18. The manufacturing method of an electrode, according to claim 1,
wherein the catalyst layer entirely covers the whisker of silicon, and
wherein the carbon layer entirely covers the catalyst layer.

19. The manufacturing method of an electrode, according to claim 8,
wherein the catalyst layer entirely covers the whisker of silicon, and
wherein the carbon layer entirely covers the catalyst layer.

20. The manufacturing method of an electrode, according to claim 13,
wherein the catalyst layer entirely covers the whisker of silicon, and
wherein the carbon layer entirely covers the catalyst layer.

* * * * *